Figure 1:
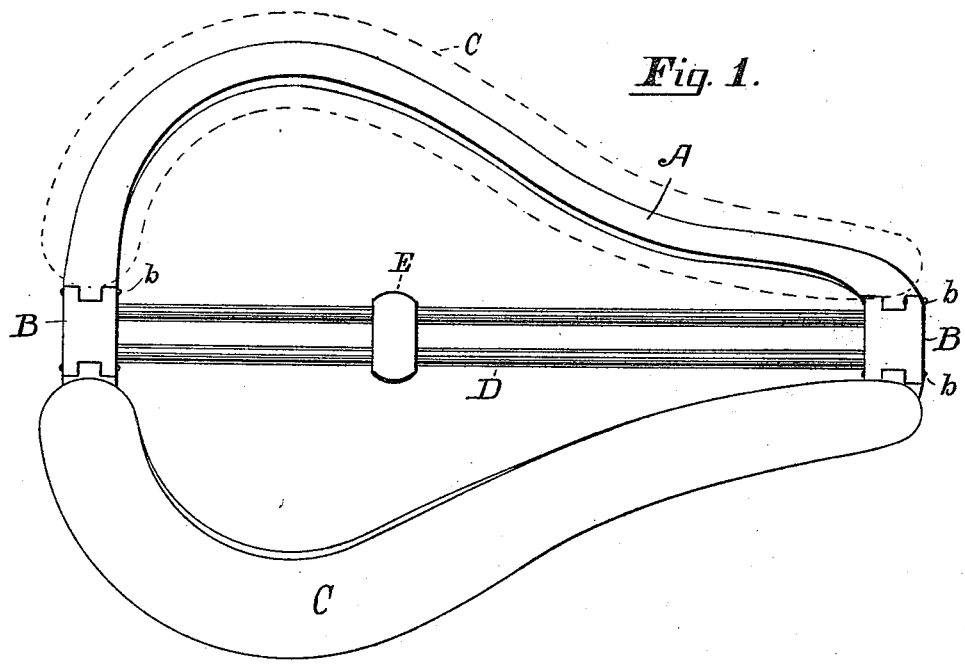

No. 621,895. Patented Mar. 28, 1899.
P. BRODIE.
BICYCLE SADDLE.
(Application filed Nov. 1, 1897.)
(No Model.) 2 Sheets—Sheet 1.

Witnesses:

Inventor,
Patrick Brodie;
By A. B. Upham,
Attorney.

No. 621,895. Patented Mar. 28, 1899.
P. BRODIE.
BICYCLE SADDLE.
(Application filed Nov. 1, 1897.)
(No Model.) 2 Sheets—Sheet 2.
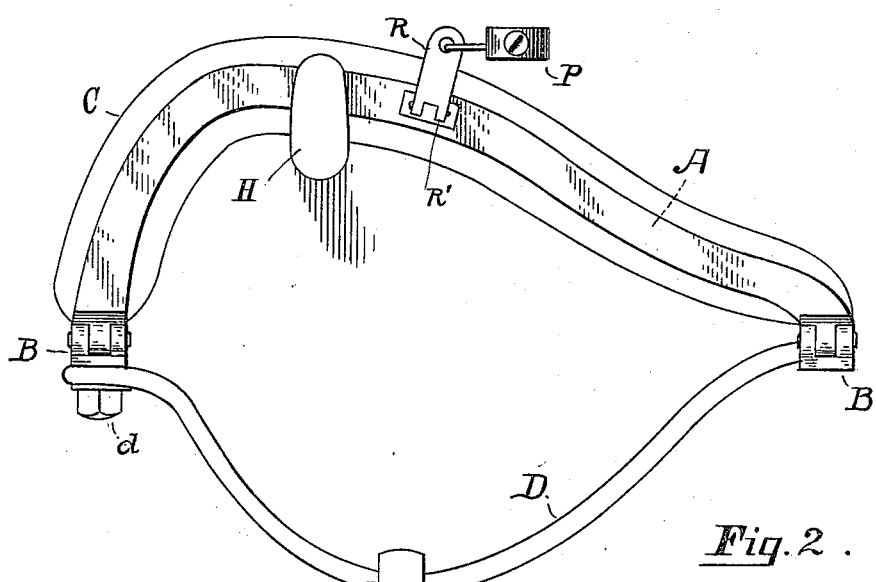
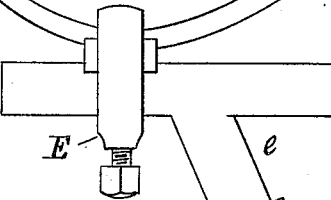
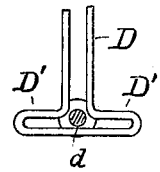
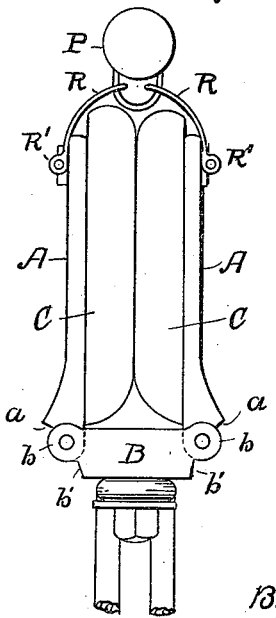
Witnesses:
F. E. Caller
H. W. Jarvis
Inventor,
Patrick Brodie;
By A. B. Upham,
Attorney.

UNITED STATES PATENT OFFICE.

PATRICK BRODIE, OF BOSTON, MASSACHUSETTS.

BICYCLE-SADDLE.

SPECIFICATION forming part of Letters Patent No. 621,895, dated March 28, 1899.

Application filed November 1, 1897. Serial No. 656,986. (No model.)

*To all whom it may concern:*

Be it known that I, PATRICK BRODIE, a citizen of the United States, residing at South Boston, in the county of Suffolk and State of Massachusetts, have invented a new and useful Bicycle-Saddle, of which the following is a full, clear, and exact description.

The object of this invention is the construction of a saddle which can be folded together like a book and rendered thereby wholly incapable of being ridden until unlocked and restored to its normal position and in the general improvements in details hereinafter set forth.

My invention for this purpose comprises, essentially, two outwardly-curved rods united at their ends and supported thereat by the usual arrangement for connection with the bicycle saddle-post, said rods being covered with narrow pads correspondingly curved.

Referring to the drawings forming part of this specification, Figure 1 is a plan view of my saddle with a portion of the pad removed. Fig. 2 is a side elevation of the same when locked in its folded position. Fig. 3 is an end view of the same. Fig. 4 is an end view upon a smaller scale, showing the bicycle-saddle in its normal form, but without pads; and Fig. 5 is a detail view of the spring-bars which support the saddle.

As shown in Fig. 1, the rods A are outwardly curved and hinged at their ends to the blocks B, the latter being rigidly secured to the twin bars D, adapted to be clamped in the usual manner to the saddle-post e of a bicycle. Each rod A lies in substantially a single plane, the two planes making an oblique angle with respect to each other when the said rods are in their normal position. This is indicated in the view given by Fig. 4.

The hinges b are enabled to sustain the rods A in their normal position by the shoulders a' b', as illustrated in Fig. 4. By such means the said rods can be unresistingly raised until they meet, as in the same figure, but when turned downward can be depressed no farther than the oblique angle desired.

My means for locking the saddle in a position of non-use comprises the pivoted eyes R, with which a padlock P can be engaged. Said eyes are pivoted at R' to their respective saddle-rods A in order that they shall drop out of the way when the saddle is in use.

Upon the rods A are secured the long narrow and correspondingly-curved pads C, by which the saddle is made soft and comfortable to the user. These pads are preferably formed from chamois-skin stuffed with curled hair; but I do not restrict myself to such materials.

Instead of depending upon the shoulders a' b' for sustaining the wings of the saddle in their normal position I extend laterally the spring-bars D, by which the saddle is supported. This is shown in Figs. 5 and 6, where D' represents the same. This not only sustains said saddle-wings with less strain upon the hinges, since said lateral extensions D' reach points beneath the said wings at a greater distance from the hinge-pintles, but in addition increases the resilience of the wings themselves and adds thereby to the comfort of the saddle.

By folding together the two wings of the saddle and locking them in this position I prevent the bicycle from being stolen and ridden away when left on the street for a short time. Furthermore, the saddle thus arranged makes a very convenient loop by which to suspend the bicycle from a hook or other support when storing it away. The hinged rods A or "wings," as they may be termed, are curved in plan view into approximately the outline of a pear. It will also be seen that a part of the beneficial effect of my saddle resides in the resilience of the rods A themselves.

What I claim as my invention, and desire to secure by Letters Patent, is as follows, to wit:

1. The bicycle-saddle having the seat-frame divided along its longitudinal line and having such halves or wings so hinged together as to be capable of being flexed upward until they meet and present their lateral edges uppermost, or of being turned down and held in a substantially horizontal and usable position, in combination with means whereby said halves or wings can be locked together when in such upwardly-flexed position and the saddle put thereby in a condition of non-use.

2. In a bicycle-saddle, the combination with the spring-bars terminally curved upward, of the blocks secured to said bar ends, the slender rods forming the seat-frame curved as shown and hinged to said blocks at their ends, pads for said rods, and a lock for fastening said hinged rods in a raised position, substantially as and for the purpose set forth.

3. In a bicycle-saddle, the combination of the blocks, the slender curved rods hinged thereto and suitably padded, the spring-rods formed from a single length of metal bent to make the lateral extensions to support the curved rods, and the bolts extending through the space between the ends of said double spring-rods and tapped into said blocks, substantially as and for the purpose set forth.

In testimony that I claim the foregoing invention I have hereunto set my hand and seal this 27th day of October, in the year 1897.

PATRICK BRODIE. [L. S.]

Witnesses:
A. B. UPHAM,
MARY U. UPHAM.